United States Patent [19]

Ver Strate et al.

[11] 3,791,913

[45] Feb. 12, 1974

[54] FREE FLOWING ELASTOMER PELLETS AND PROCESS FOR THEIR PREPARATION

[75] Inventors: Gary Ver Strate, Matawan; Edward N. Kresge, Watchung, both of N.J.

[73] Assignee: Esso Research and Engineering Company, Linden, N.J.

[22] Filed: May 17, 1971

[21] Appl. No.: 144,300

[52] U.S. Cl. .................................................. 161/164
[51] Int. Cl. ............................................... B32b 33/00
[58] Field of Search 264/15, 117, 14; 161/168, 164; 117/100 C, 62.1, 118

[56] References Cited
UNITED STATES PATENTS

| | | | |
|---|---|---|---|
| 2,977,864 | 4/1961 | Pullar | 117/100 C |
| 3,025,267 | 3/1962 | Calfee | 117/100 C |
| 3,509,247 | 4/1970 | Perrone et al. | 117/100 C |
| 3,343,980 | 9/1967 | Hirshfeld | 117/100 C |

*Primary Examiner*—Charles E. Van Horn
*Attorney, Agent, or Firm*—Chasan & Sinnock; Harold Einhorn

[57] ABSTRACT

Free flowing pellets of substantially unvulcanized elastomeric polymers having a cured surface are prepared by exposing the pellets to a curing medium for said elastomer for sufficient time to allow vulcanization of the exterior portions of the pellet; i.e., so that the pellet is cured to a maximum depth of about one-tenth of the diameter of its smallest dimension.

9 Claims, No Drawings

FREE FLOWING ELASTOMER PELLETS AND PROCESS FOR THEIR PREPARATION

BACKGROUND OF THE INVENTION

Elastomers which do not contain polymeric material of high molecular weight or with long relaxation times flow under their own weight. Because of this, the elastomers cannot be pelletized or put in some other discrete form, and then stored for any reasonable period of time without the material flowing together to form larger agglomerates. Because of these difficulties, elastomers are normally shipped and used as bales of rubber. This has several disadvantages. The bales must be cut on expensive equipment and cannot be preblended with other materials. Further, elastomers have either been restricted to batch rather than continuous processes in normal rubber applications or a separate step of grinding up the rubber is required prior to the continuous process. Plastics blending applications have been particularly plagued with these problems, since the plastic component of the blend is in pellet form.

Numerous attempts have been made to overcome the disadvantages inherent in using pelletized elastomers. Dusting with inorganic materials, e.g., clay, talc, and the like, allows maintenance of discrete pellets for short periods of time. Slightly better results have been attained by dusting with selected organic materials, such as hydrocarbon waxes, powdered solid polyethylenes and polypropylenes, etc. However, all of these methods are useful for only relatively short periods of time. On long-term storage, because of the discontinuity of the pellet coatings, the rubber will still flow together into a solid mass.

Another approach to the problem, yielding somewhat better results, has been to blend into the rubber a crystalline type of polymer such as polyethylene or polypropylene or copolymers thereof, during the rubber finishing operation. Disadvantages of this type of operation are that the resulting pellets, while relatively free flowing, contain a maximum of only about 50 percent rubber with the crystalline polymer intimately admixed therewith. Such a high percentage of irremovable crystalline polymer makes this type of pellet disadvantageous for many purposes.

THE PRESENT INVENTION

It has now been unexpectedly discovered that free flowing, easily mixable elastomeric pellets which maintain their integrity on long-term storage, may be attained by exposing the elastomeric pellet to certain curing systems for only short periods of time, e.g., less than a second, with the result being that only the surface of the elastomer pellet is subjected to curing while the body of the pellet remains substantially unvulcanized. Thus, pellets are produced which will not cold flow or stick to similar samples or a container but which have only a small amount of gel present such that ultimate performance is not impaired.

Although this invention is applicable to any curable unsaturated elastomer, for practical purposes only those elastomers which do not contain polymeric material of high molecular weight (e.g., weight average molecular weight of greater than about $10^6$) or have long relaxation times (e.g., $> 10^5$ to $10^7$ sec.), and thus tend to flow under their own weight, are considered to be useful in the instant invention. By an unsaturated elastomer is meant an elastomer having at least 0.2 and preferably at least 0.5 mole percent unsaturation. Typical examples of unsaturated elastomers useful in the instant invention include but are not limited to ethylene-propylene-diene terpolymers (EPDMs), butyl rubber, polybutadiene, polyisoprene, polychloroprene, polypiperylene, dehydrohalogenated ethylene-propylene elastomers, and styrenebutadiene copolymers (SBR). Each of these polymers is well-known in the art.

Particularly preferred unsaturated polymers for use in the instant invention include EPDMs, butyl rubber, polybutadiene, and polyisoprene. The term "EPDM" is used in the sense of its definition as found in ASTM D1418-64. These polymers normally contain about 45 to about 90 wt. percent ethylene and about 2 to about 10 wt. percent of a diene monomer, the balance of the polymer being propylene. Preferably, the polymer contains about 50 to about 75 wt. percent ethylene, e.g., 56 wt. percent, and about 2.6 to about 9 wt. percent of a diene monomer, e.g., 3.5 wt. percent. The viscosity average molecular weight range is generally about 20,000 to about 800,000, preferably about 40,000 to about 450,000, and most preferably about 80,000 to about 300,000. The diene monomer is preferably a nonconjugated diene. Typical examples of nonconjugated dienes include 5-alkylidene-2-norbornenes such as 5-methylene-2-norbornene, 5-ethylidene-2-norbornene, etc.; 5-alkenyl-2-norbornenes such as 5-vinyl-2-norbornene, 5-(3'-butene)-2-norbornene, etc.; 2-alkyl-norbornadienes such as 2-methyl-norbornadiene, 2-ethyl-norbornadiene, etc.; acyclic nonconjugated dienes such as 1,4-hexadiene, 11-ethyl-1,11-tridecadiene, 2,4-dimethyl -2,7-octadiene, etc.; acyclic nonconjugated dienes such as dicyclopentadiene, etc.; hydroindenes such as 4,7,8,9-tetrahydroindene, etc.

The term "butyl rubber" is intended to include copolymers made from a polymerization reaction mixture having therein from about 70 to about 99.5 percent by weight of an isoolefin which has about four to seven carbon atoms, e.g., isobutylene, and about 0.5 to 30 percent by weight of a conjugated multiolefin having from four to 14 carbon atoms, e.g., isoprene, piperylene, butadiene, etc. The resulting copolymer contains 85 to 99.8 percent by weight of combined isoolefin and 0.2 to 15 percent by weight of combined multiolefin. Butyl rubber generally has a Staudinger molecular weight of about 20,000 to about 500,000, preferably about 25,000 to about 400,000, especially about 100,000 to about 400,000, and a Wijs iodine number of about 0.5 to about 50, preferably about 1 to about 15.

Polybutadiene (either cis-1,4, trans-1,4 or mixtures) is a polymer well-known in the art. It normally has number average molecular weights in the range of about 3,000 to about 600,000, and preferably about 100,000 to about 350,000.

The pellets of the instant invention may be of any conventional shape, e.g., rods, spheroids, etc., and include pellets having a minimum dimension of from about 1 mm. to a maximum dimension of about 10 cm. or larger. Pellets similar in size to conventional plastic pellets, i.e., about 0.2 to about 0.8 cm., are advantageous for many applications, and therefore preferred for use in this invention.

The pellets of the unvulcanized elastomer to be surface-cured are exposed to a curing medium for that elastomer for a sufficient time to allow vulcanization of the exterior portions of the pellet to a depth of not more than about one-tenth, and preferably not more than about (1/100th), of the diameter of the smallest dimension of the pellet. The cured surface prevents the pellets from sticking together and maintains their integrity. The resulting product is a substantially unvulcanized elastomer pellet, i.e., the bulk of the pellet is unchanged with no substantial change in total polymer properties after treatment, e.g., Mooney viscosity.

The cross-link density (this being due to chemical cross-links and entanglements) of the cured surface, in order to prevent cold flow and allow ready processibility of the pellet, should be between about $5 \times 10^{-6}$ moles of cross-links/cm$^3$ and about $1.0 \times 10^{-3}$ moles of cross-links/cm$^3$. Preferably, the surface cross-link density will be in the range of about $1 \times 10^{-5}$, and about $5 \times 10^{-5}$, moles of cross-links/cm$^3$. The cross-link density of the reacted surface of the elastomer is determined by swelling under equilibrium conditions in an appropriate diluent, finding the wt. percent swell and then calculating the cross-link density from swelling-cross-link density relationships previously calibrated by determining the modulus corresponding to that degree of swelling and applying rubber elasticity theory. For a good general discussion of the application of this relationship to the polymers of the instant invention, see Chapter XIII of "The Principles of Polymer Chemistry," by P. J. Flory, Cornell University Press (1953). Exposure time and temperature conditions are dependent upon the curing medium, and will be discussed in detail below.

The system generally preferred to effect cure for the elastomers useful in the instant invention is a fluid phase curing technique. The preferred embodiment of the fluid curing approach can be carried out with any curing medium which is normally gaseous, or can be made gaseous at ambient or slightly elevated temperatures, e.g., up to 100°C., and is known to effect cross-linking of polymers with unsaturation. Preferably, the gaseous curing medium will be selected from the group consisting of sulfur dichloride ($SCL_2$), sulfur monochloride ($S_2CL_2$), trichloromethyl sulfonyl chloride ($CL_3CSCL$), and organo-bis (sulfonyl-halide) compounds of the type CLS-R-SCL wherein R is an organic molecule (aryl, alkyl, aralkyl, or alkaryl) having from one to 50, preferably one to 10, and most preferably one to five, carbon atoms which can be substituted with either polar or nonpolar substituents. Mixtures of the above materials, along with their bromine and iodine analogs, may also be employed. Most preferably, the gaseous curing system to be employed, and the one that has been used in the examples of this invention, is sulfur dichloride either alone or as a mixture with sulfur monochloride.

Commercially available $SCL_2$ is an equilibrium mixture containing about 10 wt. % $S_2CL_2$ and 5 wt. % $CL_2$. Rosser and Whitt, J. Appl. Chem., 10, 229 (1960), have shown that this equilibrium can be displaced towards $SCL_2$ by destroying the equilibrium catalysts with 0.1 % $PCL_5$.

The curing reaction may be carried out by exposure of the unvulcanized elastomeric pellet to the vapors of the curing agent or to a solution of the curing agent in a non-reactive solvent for the polymer, e.g., a dilute solution of $SCL_2$ in $CH_2CL_2$. The concentration of the curing agent in solution or in the vapor phase is selected to give the desired cross-link density and depth of cure. This will depend, for instance, on the temperature of cure, the degree of unsaturation in the uncured elastomer, and the linear velocity of the pellet passing through the curing zone or chamber in a continuous production operation. Optimization of these parameters will be obvious to one skilled in the art.

Typical conditions to attain the desired extent of cure when employing the preferred gaseous curing medium, i.e., $SCL_2$ or $SCL_2$—$S_2CL_2$ equilibrium mixture, may involve exposing a pellet to the vapor at a partial pressure for the vapor of from about 0.01 to about 1 atmosphere, more preferably about 0.05 to about 0.5 atmospheres, for a period of time from about 0.01 to about 1 second, more preferably about 0.05 to about 0.5 seconds, at a pellet temperature of from about 500°F. (i.e., the temperature of the pellet when removed directly from the extruder) to ambient temperatures, preferably at a temperature of from about 50° to about 400°F. At higher temperatures, thinner, tighter cures may be effected and shorter cure times are required.

As is well-known in the art, unsaturated elastomers may also be subjected to peroxide cure and these well-known peroxide cure systems may be employed to produce the surface cure of the instant invention. However, certain critical conditions must be adhered to in order to attain the desired depth of cure and cross-link density for the cured pellet surface. Exposure time and peroxide concentration are the most critical factors to be considered. Exposure time must be on the order of about 30 to about 300 seconds, preferably about 60 to about 120 seconds, when concentration of peroxide is in the range of about 5 to about 15 percent. These two criteria are seen to be inversely related and it is possible for the skilled art worker, if so desired, to vary the concentration range and calculate pellet exposure time at that new concentration from the above ranges.

The desired pellet temperature, when exposed to the peroxide cure system, is dependent to a large extent upon the peroxide employed and the decomposition point for that peroxide. Typically, a temperature in the range of from about 70° to about 150°C. is employed. It is also necessary that the solvent chosen for the peroxide not be capable of solubilizing the rubber pellet to any appreciable degree. After exposure of the pellet to the peroxide, it is heated to a temperature in the range of about 150° to about 250°C., more preferably about 180° to about 220°C., for a period of from about 1 to about 5 minutes, more preferably from about 2 to about 3 minutes, in order to effect a cure. Microwaves can be used in lieu of thermal heating.

Illustrative examples of peroxides which may be employed include, but are not limited to dicumyl peroxide, dibenzoyl peroxide, di-t-butyl peroxide, cumene hydroperoxide, methylethyl ketone peroxide, T-butyl perbenzoate, bis(alpha,alpha-dimethyl benzol) peroxide, 2,5-bis(t-butyl peroxy)-2,5-dimethyl hexane, etc. Preferably, the peroxide employed will be dicumyl peroxide or di-t-butyl peroxide.

No matter which cure system is used, cure is not effected instantaneously. It is therefore necessary to keep the pellets separated from one another for a sufficient period of time, e.g., about 0.1 to about 4 hours, until cure is complete. Otherwise, the pellets will tend to agglomerate. Alternatively, it is possible to dust the surface-treated pellets with talc immediately after cooling, which talc-coating will prevent agglomeration of the pellets on contact for sufficient time to allow complete cure. This latter method is preferable because of the obvious time savings.

In order that those skilled in the art may better understand how the present invention may be practiced, the following examples are given by way of further illustration and not by way of limitation.

EXAMPLE 1

Cylindrical pellets with a radius of 0.5 cm. and a length of 1 cm. of an EPDM rubber having an ethylene content of 45 wt. percent, a diene content of 3.2 wt. percent, and a viscosity average molecular weight of $2.9 \times 10^5$ were dropped through a cylindrical tube, 40 inches in length and 2 inches in diameter containing $N_2$ and $SCL_2$ vapor at a pellet temperature of 25°C. This resulted in an exposure time of 0.5 seconds. The concentration of $SCL_2$ vapor was 0.05 atm., which resulted from bubbling $N_2$ at 150 ml/min. through liquid $SCL_2$ at 0°C. and then entering the chamber at the top and exiting at the bottom under atmospheric pressure. The ends of the tube were partially sealed with Mylar film (a product of the DuPont Company) containing slits which were opened by the pellets' weight. The pellets fell into a beaker of talc. The pellets were then packed into a 150 ml. beaker and subjected to a 2-½ psi compressive force. After 5 weeks the pellets could be poured from the beaker as individual specimens, whereas uncured control pellets, with or without talc, had agglomerated and had to be cut from the beaker.

An analysis of the pellets by volume swelling techniques at 25°C. revealed 1 percent gel in the original material (probably attributable to crystallinity since no gel was present when determined in decalin solution at 135°C.) and 4.6 percent gel in the cured pellets. If the additional 3.6 percent gel were of uniform cross-link density on the surface of the cylindrical pellet, the thickness of the surface gel was $6 \times 10^{-3}$ cm. Physical examination of the pellet reveals the surface to be cured and the interior uncured. The swelling ratio indicated the cross-link density to be approximately $3 \times 10^{-5}$ moles network chains/cc. in the cured surface; this material is predominantly a skinlike layer which originally covered the pellet. Curing the entire pellet to this cross-link density would drastically alter the rheological properties and produce nearly total insolubility of the pellet.

The nature of the pellet interior was determined by carefully cutting off the cured surface from several pellets and then determining the molecular weight and gel content of the interior portion. The interior polymer exhibited no gel and a viscosity average molecular weight of $2.9 \times 10^5$ as determined in decalin solution at 135°C. This was the same as the starting polymer showing no cross-linking of the interior of the pellet. Therefore, the cure is restricted to only the pellet surface.

EXAMPLE 2

An experiment was performed under identical conditions as in Example 1, with the only exception being that the pellet temperature was 130°F. The pellets did not agglomerate in the beaker. The cross-link density and gel content were slightly higher. The cured pellets contained 6.3 percent gel. The swelling ratio indicated the cross-link density to approximately $2.2 \times 10^{-5}$ moles network chains/cc. in the cured surface.

The interior was examined as in Example 1 and showed no gel and no change in viscosity average molecular weight as determined in decalin solution at 135°C.

EXAMPLE 3

$0.5 \times 0.75$ cm. butyl rubber pellets (isobutylene-isoprene copolymer having a viscosity average molecular weight of 540,000) were subjected to identical conditions as in Example 1. In this case, the pellets after contact with $SCL_2$, agglomerated into a solid mass after 3 weeks at 2-½ psi compression at room temperature. Uncured control butyl rubber pellets, treated with talc, agglomerated under the same conditions within 16 hours.

EXAMPLE 4

Cis-polybutadiene of about 70,000 number average molecular weight was pelletized into one-fourth inch cubes. The cubes were exposed to 0.2 atmospheres of $SCL_2$ vapor for 0.24 seconds at 26°C. The pellets were coated with talc and packed into a 150 ml. beaker and subjected to a 1.2 psi compressive force. After 3 weeks the pellets could be poured from the beaker as individual pellets. Control pellets of the same size with or without talc formed a solid mass and had to be cut from the beaker.

The pellets contained 6.2 percent gel in n-heptane after contact with $SCL_2$ and were completely soluble prior to contact. The swell ratio in n-heptane indicated the cross-link density of the gelled surface was about $1.3 \times 10^{-4}$ moles of network chains/cc.

While these examples adequately illustrate the invention, the present invention in its broadest aspects is not necessarily limited to the specific materials, conditions and procedures shown therein. The present invention is limited only by the claims which follow.

What is claimed is:

1. A substantially unvulcanized vulcanizable unsaturated elastomer pellet of at least 0.2 mole percent unsaturation having a cured surface.

2. The pellet of claim 1 wherein said surface is cured to a depth of not more than about one-tenth of the diameter of the smallest dimension of said pellet.

3. The pellet of claim 2 wherein the smallest dimension of said pellet is about 1 mm.

4. The pellet of claim 3 wherein the cross-link density of the cured surface is between about $0.5 \times 10^{-5}$ and about $10 \times 10^{-4}$ moles of cross-links per cubic centimeter.

5. A process for preparing a free-flowing, substantially unvulcanized vulcanizable unsaturated elastomer pellet of at least 0.2 mole percent unsaturation which comprises exposing said unvulcanized vulcanizable unsaturated elastomer pellet to a curing medium for said elastomer for sufficient time to allow vulcanization of only the exterior portions of said pellet.

6. The process of claim 5 wherein the exposure time is such that the pellet exterior is vulcanized to a depth of not more than about one-tenth of the diameter of the smallest dimension of said pellet.

7. The process of claim 6 wherein the substantially unvulcanized vulcanizable elastomer pellet comprises an unsaturated elastomer of at least 0.5 mole percent unsaturation and the curing medium is selected from the group consisting of $SCl_2$, $S_2Cl_2$, $Cl_3CSCl$ compounds of the type ClS-RSCl where R is an organic molecule having from one to 10 carbon atoms, and mixtures thereof.

8. The process of claim 7 wherein the curing medium is gaseous and selected from the group consisting of $SCl_2$ and an equilibrium mixture of $SCl_2$ and $S_2Cl_2$.

9. The process of claim 8 wherein the exposure time for the pellet is from about 0.01 to 1 second, the partial pressure of the curing medium is from about 0.01 to about 1 atmosphere, and the pellet temperature is from about 500°F. to ambient.

* * * * *